(12) United States Patent
Amaya et al.

(10) Patent No.: US 10,926,469 B2
(45) Date of Patent: Feb. 23, 2021

(54) THREE-DIMENSIONAL LAMINATING AND FABRICATING SYSTEM, THREE-DIMENSIONAL LAMINATING AND FABRICATING METHOD, LAMINATING AND FABRICATING CONTROL APPARATUS AND METHOD OF CONTROLLING THE SAME, AND CONTROL PROGRAM

(71) Applicant: TECHNOLOGY RESEARCH ASSOCIATION FOR FUTURE ADDITIVE MANUFACTURING, Tokyo (JP)

(72) Inventors: Koichi Amaya, Fukui (JP); Tetsushi Midorikawa, Fukui (JP); Masaaki Kawaji, Fukui (JP)

(73) Assignee: TECHNOLOGY RESEARCH ASSOCIATION FOR FUTURE ADDITIVE MANUFACTURING, Tokyo (JP)

( * ) Notice: Subject to any disclaimer, the term of this patent is extended or adjusted under 35 U.S.C. 154(b) by 1203 days.

(21) Appl. No.: 15/125,078

(22) PCT Filed: May 31, 2016

(86) PCT No.: PCT/JP2016/066059
§ 371 (c)(1),
(2) Date: Sep. 9, 2016

(87) PCT Pub. No.: WO2017/208362
PCT Pub. Date: Dec. 7, 2017

(65) Prior Publication Data
US 2018/0215095 A1    Aug. 2, 2018

(51) Int. Cl.
*B29C 64/35* (2017.01)
*B33Y 10/00* (2015.01)
(Continued)

(52) U.S. Cl.
CPC ............ *B29C 64/35* (2017.08); *B22F 3/1055* (2013.01); *B29C 64/20* (2017.08); *B29C 64/264* (2017.08);
(Continued)

(58) Field of Classification Search
CPC ..... B29C 64/35; B29C 64/264; B29C 64/282; B29C 64/20; B29C 64/393; B29C 64/277;
(Continued)

(56) References Cited

U.S. PATENT DOCUMENTS 9,138,807 B1    9/2015  Takezawa et al.
2010/0044547 A1    2/2010  Higashi et al.
(Continued)

FOREIGN PATENT DOCUMENTS

EP    2 926 925 A2    10/2015
JP    2009-6509 A    1/2009
(Continued)

OTHER PUBLICATIONS

International Search Report (ISR) dated Aug. 30, 2016 for International Application No. PCT/JP2016/066059.
(Continued)

*Primary Examiner* — Stella K Yi
(74) *Attorney, Agent, or Firm* — Ladas & Parry LLP

(57) ABSTRACT

This invention provides a three-dimensional laminating and fabricating system that can remove the influence of a gas flow between the irradiation positions by a plurality of irradiators. The three-dimensional laminating and fabricating system includes a laminating and fabricating unit that includes a plurality of irradiators configured to irradiate a laminating material, and a remover configured to generate a flow path on a laminated surface and remove dust generated by the irradiated laminating material, to cause the plurality of irradiators to perform irradiation to fabricate each layer of
(Continued)

a laminated and fabricated object made of the laminating material as an aggregate of cell regions, and a laminating and fabricating controller that controls selection of each of the cell regions to be irradiated by each of the plurality of irradiators so as to prevent the dust generated in each of the cell regions on an upstream side of the flow path from influencing fabricating in each of the cell regions on a downstream side of the flow path.

11 Claims, 15 Drawing Sheets

(51) Int. Cl.
$B33Y\ 30/00$ (2015.01)
$B29C\ 64/264$ (2017.01)
$B29C\ 64/277$ (2017.01)
$B29C\ 64/20$ (2017.01)
$B22F\ 3/105$ (2006.01)
$B33Y\ 50/02$ (2015.01)
$B29C\ 64/282$ (2017.01)
$B29C\ 64/393$ (2017.01)
$B29C\ 64/153$ (2017.01)

(52) U.S. Cl.
CPC .......... *B29C 64/277* (2017.08); *B29C 64/282* (2017.08); *B29C 64/393* (2017.08); *B33Y 10/00* (2014.12); *B33Y 30/00* (2014.12); *B33Y 50/02* (2014.12); *B22F 2999/00* (2013.01); *B29C 64/153* (2017.08)

(58) Field of Classification Search
CPC ......... B33Y 10/00; B33Y 30/00; B33Y 50/02; B22F 3/1055
See application file for complete search history.

(56) References Cited

U.S. PATENT DOCUMENTS

| | | |
|---|---|---|
| 2012/0251378 A1 | 10/2012 | Abe et al. |
| 2014/0271965 A1 | 9/2014 | Ferrar |
| 2014/0301883 A1 | 10/2014 | Wiesner et al. |
| 2015/0036700 A1 | 2/2015 | Lee |
| 2015/0174823 A1 | 6/2015 | Wiesner et al. |
| 2015/0283612 A1 | 10/2015 | Maeda et al. |
| 2016/0001401 A1 | 1/2016 | Dimter et al. |
| 2016/0136731 A1 | 5/2016 | McMurtry et al. |
| 2017/0189961 A1 | 7/2017 | Ferrar |

FOREIGN PATENT DOCUMENTS

| | | |
|---|---|---|
| JP | 2010-265530 A | 11/2010 |
| JP | 2014-201068 A | 10/2014 |
| JP | 2015-78434 A | 4/2015 |
| JP | 2015-175012 A | 10/2015 |
| JP | 5826430 B1 | 10/2015 |
| JP | 2015-199195 A | 11/2015 |
| JP | 2016-216773 A | 12/2016 |
| WO | 2011/049143 A1 | 4/2011 |
| WO | 2014/125258 A2 | 8/2014 |

OTHER PUBLICATIONS

Written Opinion (WO) dated Aug. 30, 2016 for International Application No. PCT/JP2016/066059.
J-PlatPat English abstract for JP 2015-78434 A.
J-PlatPat English abstract for JP 2010-265530 A.
J-PlatPat English abstract for JP 2015-199195 A.
J-PlatPat English abstract for JP 2014-201068 A.
J-PlatPat English abstract for JP 2015-175012 A.
Supplementary European Search Report (SESR) dated May 11, 2018 mailed in connection with corresponding European Patent Application No. EP 16 82 3146.2.
Japanese Office Action dated Jul. 18, 2017 for Japanese Application No. 2016/547114 with English translation.
J-PlatPat English abstract of JP 2009-6509 A.
J-PlatPat English abstract of JP 2016-216773 A.

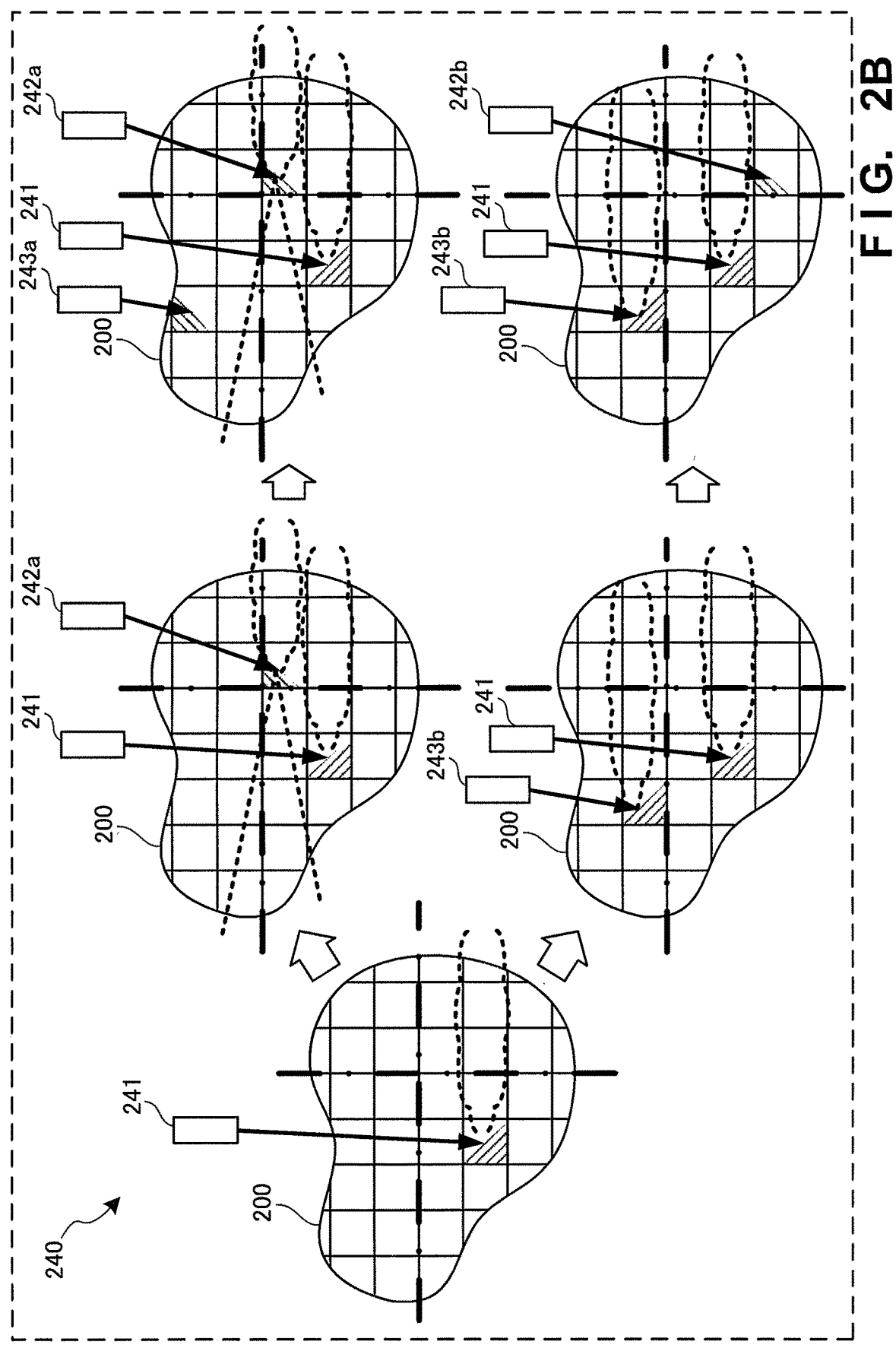

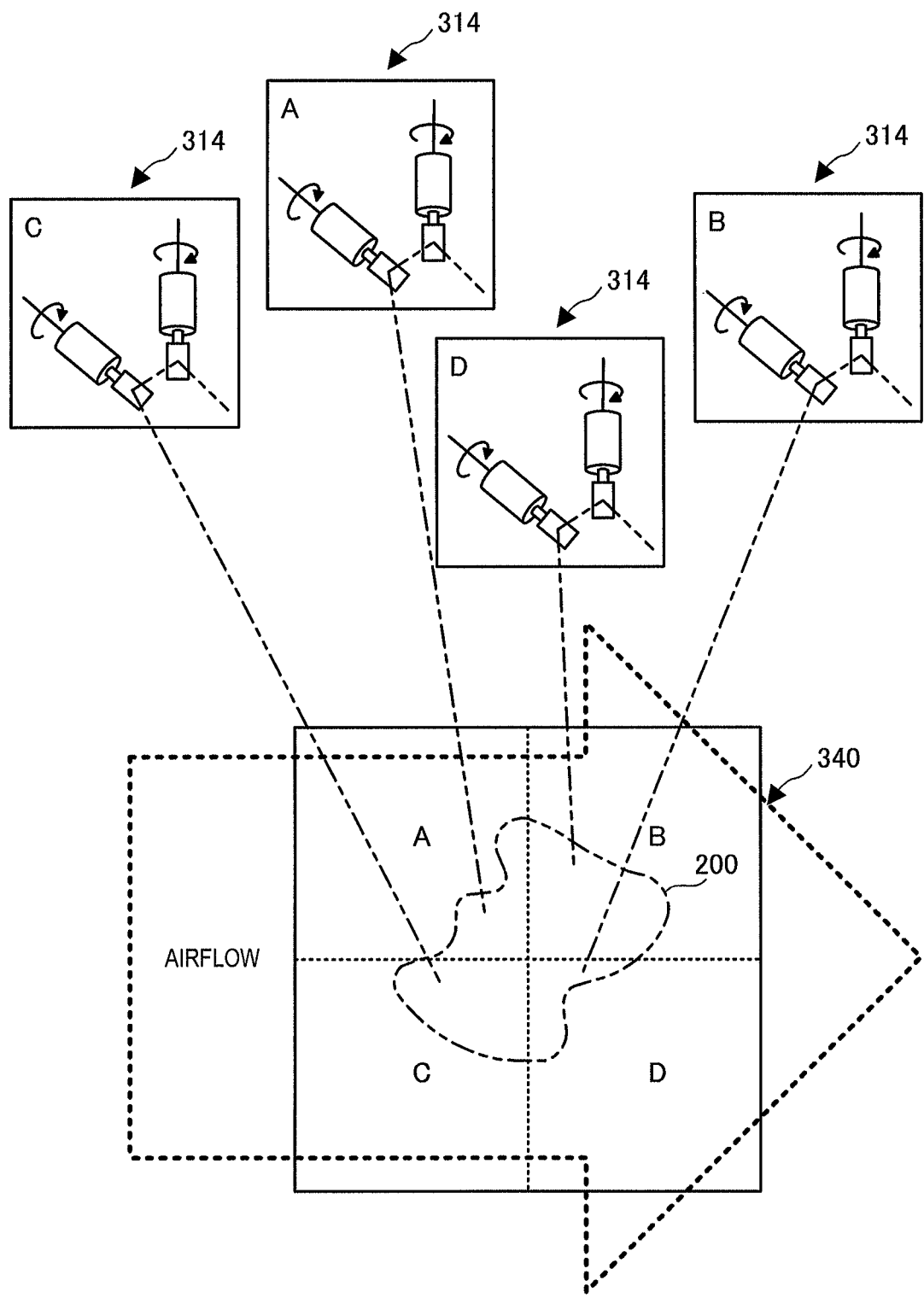
F I G. 3B

| 502a ▶ 601 | 602 IRRADIATION STATE | | 603 IRRADIATOR UNDER IRRADIATION | 604 IRRADIATION ENABLE CELL INFORMATION | 605 IRRADIATION SELECTION RESULT | |
|---|---|---|---|---|---|---|
| IRRADIATION CELL POSITION | UNIRRADIATED | IRRADIATED / UNDER IRRADIATION | | | IRRADIATOR | ORDER (TIMING) |
|  |  |  |  |  |  |  |
|  |  |  |  |  |  |  |
|  |  |  |  |  |  |  |
|  |  | ... |  |  |  |  |
|  |  |  |  |  |  |  |

| IRRADIATION CELL POSITION | IRRADIATION STATE | | | IRRADIATION SELECTION ORDER | |
|---|---|---|---|---|---|
| | UNIRRADIATED | IRRADIATED | UNDER IRRADIATION | IRRADIATOR | ORDER (TIMING) |
| | | | | | |
| | | | | | |
| | | | | | |
| ... | | | | | |
| | | | | | |

THREE-DIMENSIONAL LAMINATING AND FABRICATING SYSTEM, THREE-DIMENSIONAL LAMINATING AND FABRICATING METHOD, LAMINATING AND FABRICATING CONTROL APPARATUS AND METHOD OF CONTROLLING THE SAME, AND CONTROL PROGRAM

RELATED APPLICATION

This application is an application under 35 U.S.C. 371 of International Application No. PCT/JP2016/066059 filed on May 31, 2016, the entire contents of which are incorporated herein by reference.

TECHNICAL FIELD

The present invention relates to a technique of controlling the fabricating position of a fabricated object in three-dimensional laminating and fabricating.

BACKGROUND ART

In the above technical field, patent literature 1 discloses an apparatus that fabricates a three-dimensional workpiece by dividing the region into rectangular regions and performing fabricating using irradiation from a plurality of irradiators, in which a gas inflow system and a gas outflow system are provided, and a flow of a gas containing fine impurity particles is generated in a process chamber to exhaust the gas. In patent literature 1, the gas containing the fine impurity particles flows from the periphery of the process chamber to the center of the process chamber, and there is little influence of the gas flow between the irradiation positions of the irradiators.

CITATION LIST

Patent Literature

Patent literature 1: Japanese Patent Laid-Open No. 2015-078434

SUMMARY OF THE INVENTION

Technical Problem

However, if there is the influence of the gas flow between the irradiation positions of the plurality of irradiators, the technique described in the above literature cannot cope with fabricating position control to remove the influence.

The present invention enables to provide a technique of solving the above-described problem.

Solution to Problem

One aspect of the present invention provides a three-dimensional laminating and fabricating system comprising:

a laminating and fabricating unit that includes a plurality of irradiators configured to irradiate a laminating material, and a remover configured to generate a flow path on a laminated surface and remove dust generated by the irradiated laminating material, said laminating and fabricating unit causing said plurality of irradiators to perform irradiation to fabricate each layer of a laminated and fabricated object made of the laminating material as an aggregate of cell regions; and a laminating and fabricating controller that controls selection of a cell region to be irradiated by each of said plurality of irradiators so as to prevent the dust generated in each of the cell regions on an upstream side of the flow path from influencing fabricating in each of the cell regions on a downstream side of the flow path.

Another aspect of the present invention provides a method of three-dimensional laminating and fabricating, comprising:

causing a plurality of irradiators to perform irradiation to fabricate each layer of a laminated and fabricated object made of a laminating material as an aggregate of cell regions, using a laminating and fabricating unit including the plurality of irradiators configured to irradiate a laminating material, and a remover configured to generate a flow path on a laminated surface and remove dust generated by the irradiated laminating material; and controlling selection of each of the cell regions to be irradiated by each of the plurality of irradiators so as to prevent the dust generated in each of the cell regions on an upstream side of the flow path from influencing fabricating in each of the cell regions on a downstream side of the flow path.

Still other aspect of the present invention provides a laminating and fabricating control apparatus comprising:

a data acquirer configured to acquire data of a laminated and fabricated object as a target of laminating and fabricating; and a laminating and fabricating controller that controls a laminating and fabricating unit including a plurality of irradiators configured to irradiate a laminating material, and a remover configured to generate a flow path on a laminated surface, and removing dust generated by the irradiated laminating material, to cause said plurality of irradiators to perform irradiation to fabricate each layer of the laminated and fabricated object made of the laminating material as an aggregate of cell regions, said laminating and fabricating controller controlling selection of each of the cell regions to be irradiated by each of said plurality of irradiators based on the data of the laminated and fabricated object so as to prevent the dust generated in each of the cell regions on an upstream side of the flow path from influencing fabricating in each of the cell regions on a downstream side of the flow path.

Still other aspect of the present invention provides a method of controlling a laminating and fabricating control apparatus, comprising:

acquiring data of a laminated and fabricated object as a target of laminating and fabricating; and controlling a laminating and fabricating unit that includes a plurality of irradiators configured to irradiate a laminating material, and a remover configured to generate a flow path on a laminated surface and remove dust generated by the irradiated laminating material, to cause the plurality of irradiators to perform irradiation to fabricate each layer of the laminated and fabricated object made of the laminating material as an aggregate of cell regions, and further controlling selection of a cell region to be irradiated by each of the plurality of irradiators based on the data of the laminated and fabricated object so as to prevent the dust generated in each of the cell regions on an upstream side of the flow path from influencing fabricating in each of the cell regions on a downstream side of the flow path.

Still other aspect of the present invention provides a control program of a laminating and fabricating control apparatus, which causes a computer to execute a method, comprising:

acquiring data of a laminated and fabricated object as a target of laminating and fabricating; and controlling a laminating and fabricating unit that includes a plurality of irradiators configured to irradiate a laminating material, and a remover configured to generate a flow path on a laminated surface and remove dust generated by the irradiated laminating material, to cause the plurality of irradiators to perform irradiation to fabricate each layer of the laminated and fabricated object made of the laminating material as an aggregate of cell regions, and further controlling selection of a cell region to be irradiated by each of the plurality of irradiators based on the data of the laminated and fabricated object so as to prevent the dust generated in each of the cell regions on an upstream side of the flow path from influencing fabricating in each of the cell regions on a downstream side of the flow path.

Advantageous Effects of Invention

According to the present invention, it is possible to remove the influence of the gas flow between the irradiation positions of the plurality of irradiators.

BRIEF DESCRIPTION OF THE DRAWINGS

FIG. 2B is a conceptual view showing a fabricating state by the three-dimensional laminating and fabricating system according to the second embodiment of the present invention;

FIG. 3B is a view showing the relationship between fabricating by a plurality of irradiators of a laminating and fabricating unit and a flow path to remove dust according to the second embodiment of the present invention;

FIG. 6 is a view showing the arrangement of an irradiation cell position selection table according to the second embodiment of the present invention;

FIG. 12 is a view showing the arrangement of an irradiation cell position selection table according to the third embodiment of the present invention.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise. A term "cell region" used in this specification indicates a region obtained by dividing the fabricating region of each layer into tiny regions in three-dimensional laminating and fabricating (for example, a 0.1-mm square rectangle). A three-dimensional laminating and fabricating system according to each embodiment irradiates the cell regions according to various scanning patterns, thereby implementing fabricating of each layer as an aggregate of cell regions.

First Embodiment

A three-dimensional laminating and fabricating system 100 according to the first embodiment of the present invention will be described with reference to FIG. 1. The three-dimensional laminating and fabricating system 100 is a system that performs three-dimensional laminating and fabricating by irradiating a laminating material.

Figure 1:
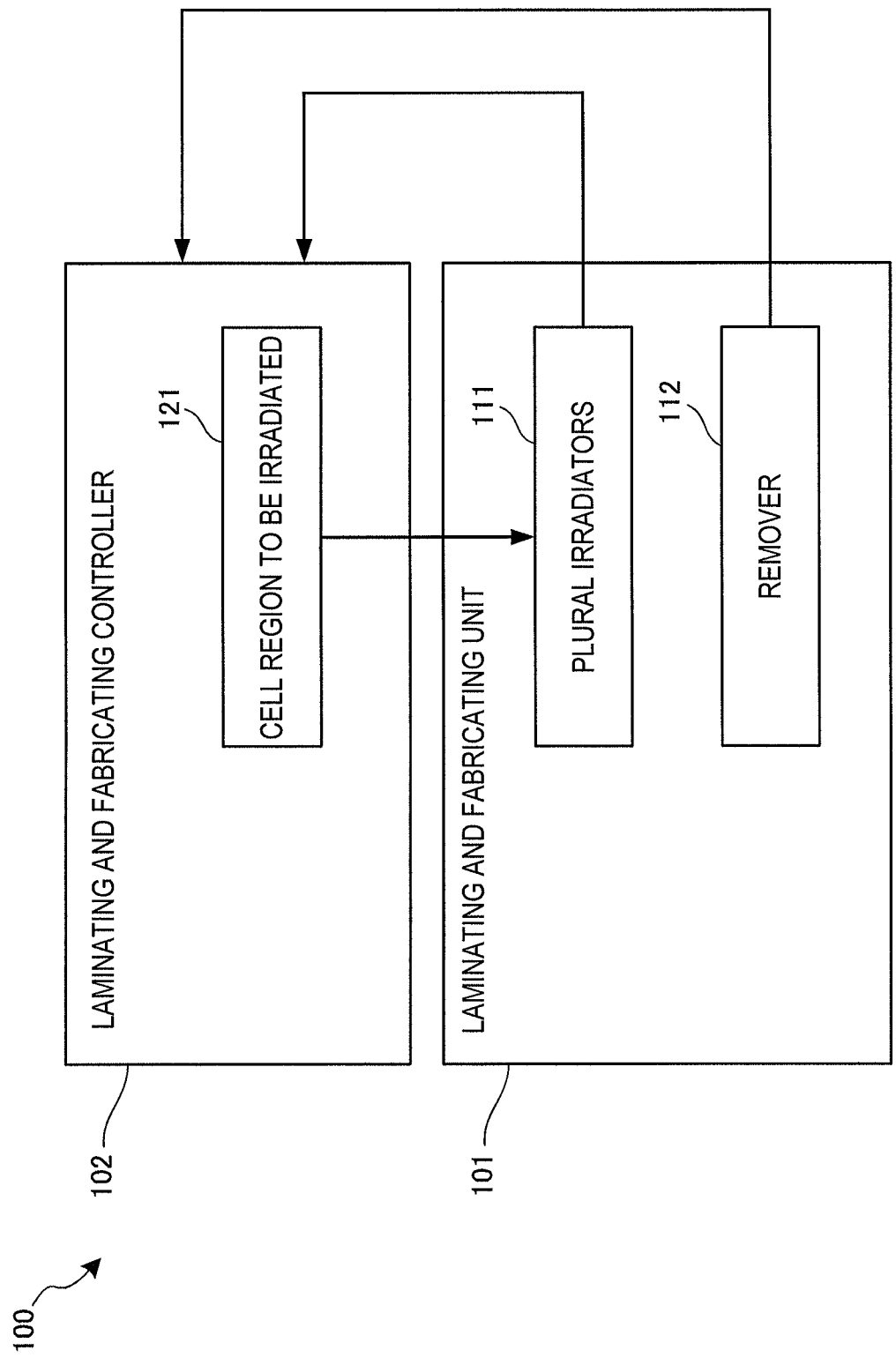
FIG. 1 is a block diagram showing the arrangement of a three-dimensional laminating and fabricating system according to the first embodiment of the present invention.

As shown in FIG. 1, the three-dimensional laminating and fabricating system 100 includes a laminating and fabricating unit 101 and a laminating and fabricating controller 102. The laminating and fabricating unit 101 includes a plurality of irradiators 111 that irradiate a laminating material, and a remover 112 that forms a flow path on the laminated surface and removes dust generated by the irradiated laminating material. The laminating and fabricating unit 101 causes the plurality of irradiators 111 to perform irradiation to fabricate each layer of a laminated and fabricated object made of the laminating material as an aggregate of cell regions. The laminating and fabricating controller 102 controls selection of cell regions to be irradiated by the plurality of irradiators so as to prevent dust generated in a cell region on the upstream side of the flow path from influencing fabricating in a cell region on the downstream side of the flow path.

According to this embodiment, selection of cell regions to be irradiated by the plurality of irradiators is controlled so as to prevent dust generated in a cell region on the upstream side of the flow path from influencing fabricating in a cell region on the downstream side of the flow path, thereby removing the influence of the gas flow between the irradiation positions of the plurality of irradiators.

Second Embodiment

Laminating and fabricating by a three-dimensional laminating and fabricating system according to the second embodiment of the present invention will be described next. In the three-dimensional laminating and fabricating system according to this embodiment, the scanning direction of a laminating material in a cell region by an irradiator is predicted based on three-dimensional fabricating data and changed for each cell region with respect to the moving direction of a squeezing blade configured to spread the laminating material on the upper layer of a laminated and fabricated object.

In this embodiment, control is performed such that when a first irradiator out of the plurality of irradiators irradiates a first cell region, a second irradiator irradiates a second cell region outside an influence range on the upstream side influencing the first cell region. In addition, control is performed such that when a third irradiator out of the plurality of irradiators irradiates a third cell region, a fourth irradiator irradiates a fourth cell region outside the influence range on the downstream side influenced by the irradiation to the third cell region.

Furthermore, selection of the cell region to be irradiated by each of the plurality of irradiators is controlled in accordance with the information of an irradiation procedure designed in advance such that when a first irradiator out of the plurality of irradiators irradiates a first cell region, a second irradiator irradiates a second cell region outside an influence range on the upstream side influencing the first cell region, and a third irradiator irradiates a third cell region outside the influence range on the downstream side influenced by the irradiation to the first cell region. Note that the influence range is set in consideration of at least the irradiation intensity and the scanning speed of each irradiator, the flow velocity of the flow path generated by the remover, and the size of the cell region.

Concept of Fabricating of Three-Dimensional Laminating and Fabricating System

Figure 2A:
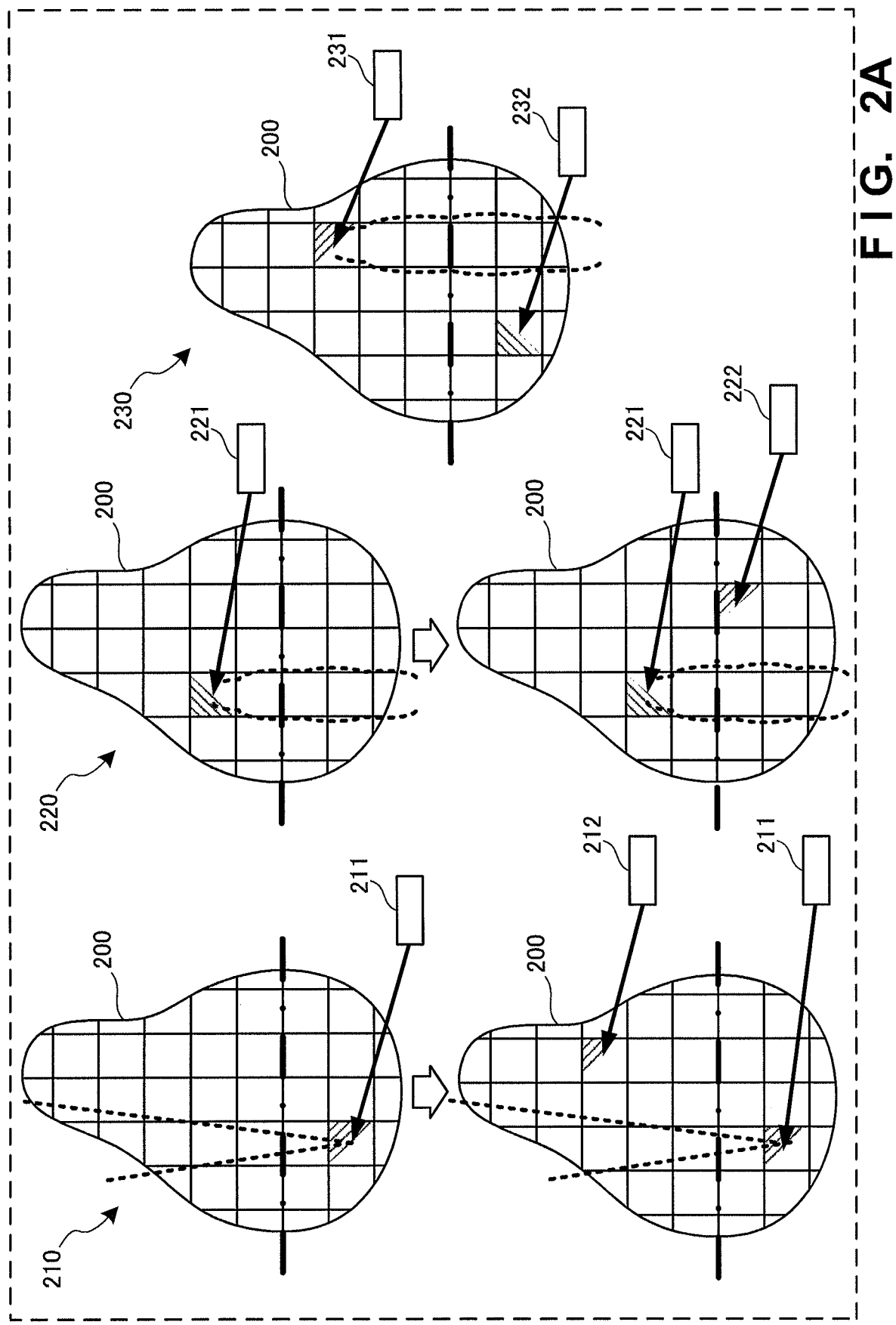
FIG. 2A is a conceptual view showing a fabricating state by a three-dimensional laminating and fabricating system according to the second embodiment of the present invention.

FIGS. 2A and 2B are conceptual views each showing a fabricating state by the three-dimensional laminating and fabricating system according to this embodiment. Note that in FIGS. 2A and 2B, a fabricating portion 200 on one laminated surface will be described as an example.

FIG. 2A shows a case in which the fabricating portion 200 is divided into two parts, and two irradiators are used to perform laminating and fabricating. The left view of FIG. 2A shows a case in which regarding an irradiation cell position under irradiation by a current irradiator 211, irradiation is performed by selecting an irradiation cell position not to be influenced by dust generated by irradiation of another irradiator 212. The central view of FIG. 2A shows a case in which an irradiation cell position not to be influenced by dust from an irradiation cell position under irradiation by a current irradiator 221 is selected and irradiated by another irradiator 222. The right view of FIG. 2A shows a case in which an irradiation cell position under irradiation by a current irradiator 231 and an irradiation cell position under irradiation by a current irradiator 232 are selected so the irradiation positions do not have the influence of dust on each other.

FIG. 2B is a conceptual view showing a fabricating state by the three-dimensional laminating and fabricating system according to this embodiment. FIG. 2B shows a case in which the fabricating portion 200 is divided into four parts, and four irradiators are used to perform laminating and fabricating. The left view of FIG. 2B shows a state under irradiation by a current irradiator 241. The central view of FIG. 2B shows a state in which based on the position under irradiation by the current irradiator 241, an irradiator 242a or an irradiator 243b is selected to irradiate next so the irradiators do not have the influence of dust on each other. The right view of FIG. 2B shows a state in which based on the positions under irradiation by the current irradiator 241 and the irradiator 242a or the current irradiator 241 and the irradiator 243b, an irradiator 243a or an irradiator 242b is further selected to irradiate so the irradiators do not have the influence of dust on each other.

Note that a case in which two irradiators are used has been described with reference to FIG. 2A, and a case in which four irradiators are used has been described with reference to FIG. 2B. However, the present invention is not limited to this. According to this embodiment, an irradiation cell position not to be influenced by dust can be selected among a plurality of irradiators.

Functional Arrangement of Laminating and Fabricating Unit

Figure 3A:
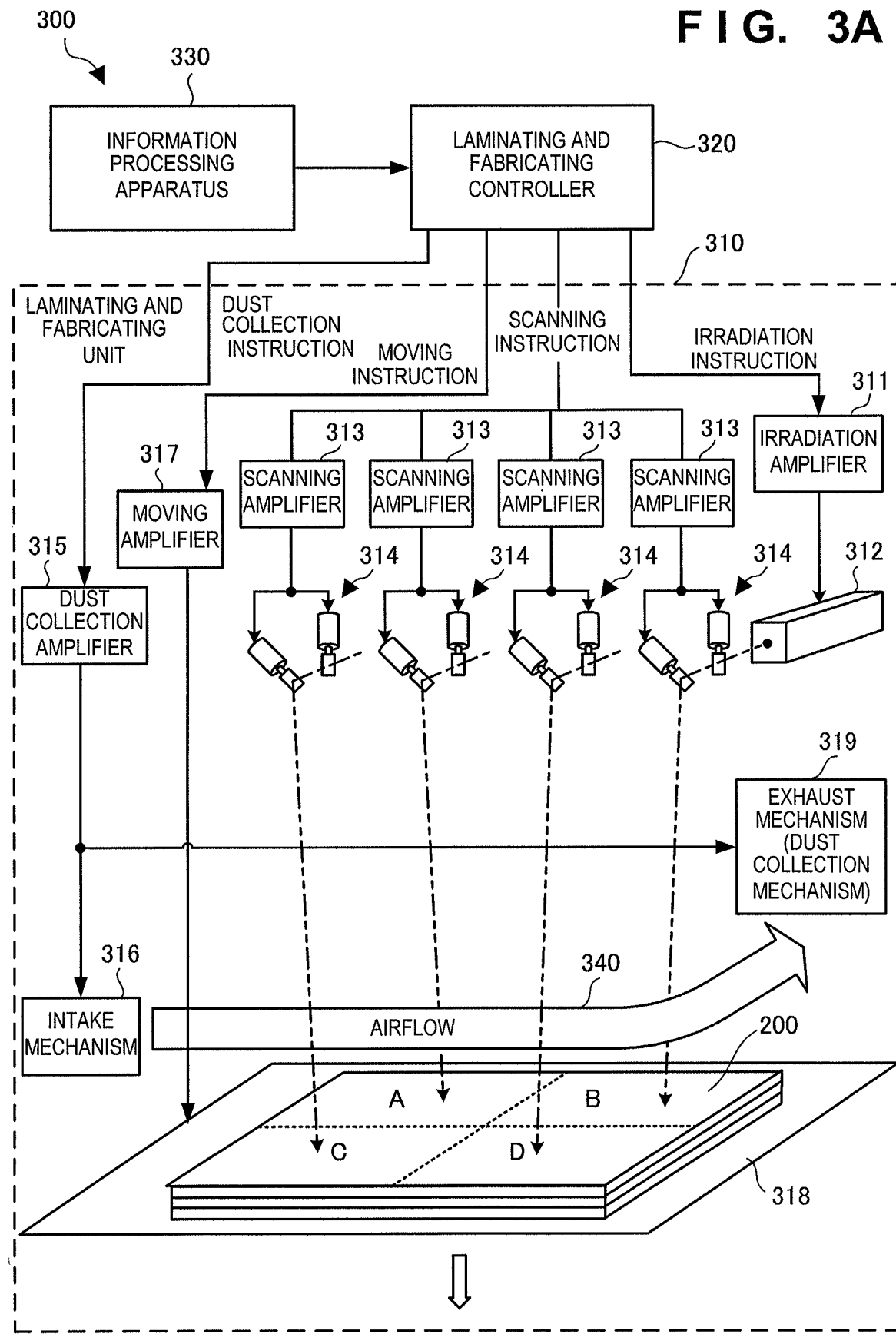
FIG. 3A is a block diagram showing the functional arrangement of a laminating and fabricating unit in the three-dimensional laminating and fabricating system according to the second embodiment of the present invention.

FIG. 3A is a block diagram showing the functional arrangement of a laminating and fabricating unit 310 in a three-dimensional laminating and fabricating system 300 according to this embodiment.

The three-dimensional laminating and fabricating system 300 includes the laminating and fabricating unit 310, a laminating and fabricating controller 320, and an information processing apparatus 330. The laminating and fabricating unit 310 generates a three-dimensional laminated and fabricated object in accordance with various kinds of control instructions from the laminating and fabricating controller 320. The laminating and fabricating controller 320 generates various kinds of control instructions used to control the laminating and fabricating unit 310 in accordance with three-dimensional fabricating data generated by the information processing apparatus 330. The control instructions include an irradiation instruction used to control an irradiator 312 by an irradiation amplifier 311, a scanning instruction used to control an operation direction by a scanning amplifier 313 via rotary step motors 314, a moving instruction used to control the movement of a fabricating table 318, and a dust collection instruction used to remove dust generated by an irradiation cell by a dust collection amplifier 315. The information processing apparatus 330 acquires the information of a laminated and fabricated object as a three-dimensional fabricating target and generates three-dimensional fabricating data. Note that the information processing apparatus 330 may be a general-purpose computer or a special computer corresponding to this embodiment.

The laminating and fabricating unit 310 includes a plurality of irradiation amplifiers 311 (note that they are represented by one irradiation amplifier), and a plurality of irradiators 312. The laminating and fabricating unit 310 also includes a plurality of scanning amplifiers 313 and corresponding rotary step motors and mirror units. The laminating and fabricating unit 310 also includes a moving amplifier 317 and the fabricating table 318. The laminating and fabricating unit 310 also includes the dust collection amplifier 315, an intake mechanism 316, and an exhaust mechanism (or a dust collection mechanism) 319, and generates an airflow 340.

FIG. 3B is a view showing the relationship between fabricating by the plurality of irradiators 312 and rotary step motors 314 of the laminating and fabricating unit and a flow path to remove dust according to this embodiment. Note that the same reference numerals as in FIG. 3A denote the same constituent elements in FIG. 3B, and a repetitive description will be omitted.

As shown in FIG. 3B, on, for example, four divided regions A to D irradiated by the four irradiators 312 and rotary step motors 314, the airflow moves from the divided regions A and C to the divided regions B and D. The fabricating portion (irradiation portion) 200 on the current laminated and fabricated surface shown in FIGS. 2A and 2B is set. Note that the direction of the airflow is not limited to that shown in FIG. 3B. The processing according to this embodiment can be implemented even in a direction reverse to or perpendicular to the direction shown in FIG. 3B or using a combination of the directions.

Functional Arrangement of Laminating and Fabricating Controller

Figure 4:
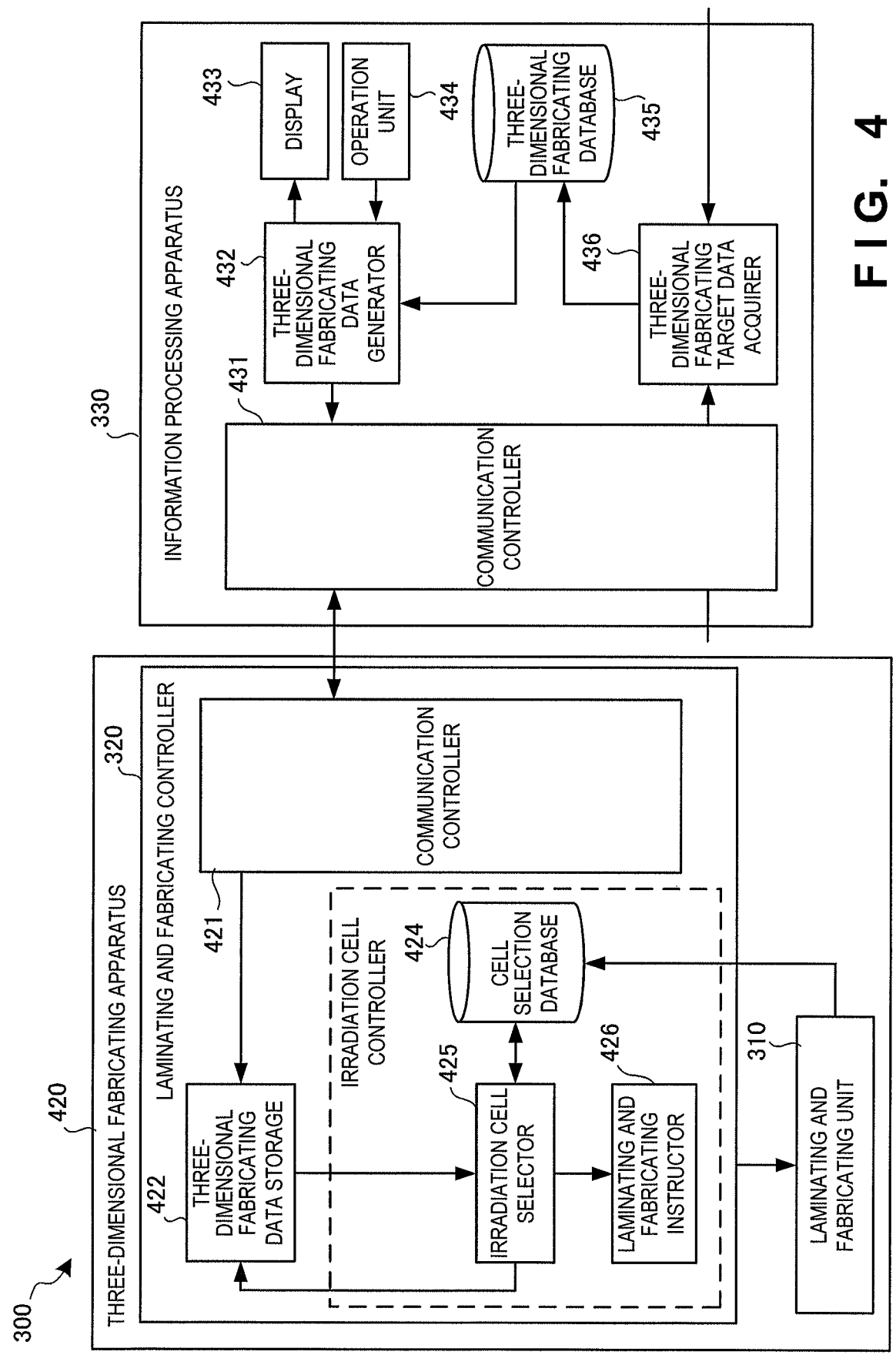
FIG. 4 is a block diagram showing the functional arrangement of a laminating and fabricating controller in the three-dimensional laminating and fabricating system according to the second embodiment of the present invention.

FIG. 4 is a block diagram showing the functional arrangement of the laminating and fabricating controller 320 in the three-dimensional laminating and fabricating system 300 according to this embodiment. FIG. 4 shows the functional arrangements of the laminating and fabricating controller 320 and the information processing apparatus 330 shown in FIG. 3A. The laminating and fabricating unit 310 and the laminating and fabricating controller 320 may form a three-dimensional fabricating apparatus 420, that is, a so-called 3D printer. The arrangement of the laminating and fabricating unit 310 is the same as in FIG. 3A, and a repetitive description will be omitted. Note that FIG. 4 illustrates the information processing apparatus 330 and the three-dimensional fabricating apparatus 420 including the laminating and fabricating controller 320 as separate apparatuses. However, they may be formed as one apparatus, or the laminating and fabricating controller 320 may be combined with the information processing apparatus 330.

The laminating and fabricating controller 320 includes a communication controller 421, a three-dimensional fabricating data storage 422, a cell selection database 424, an irradiation cell selector 425, and a laminating and fabricating instructor 426.

The communication controller 421 controls communication between the laminating and fabricating controller 320 and the information processing apparatus 330 and receives three-dimensional fabricating data, an instruction command, or the like from the information processing apparatus 330, or transmits the status of the laminating and fabricating controller 320 or the laminating and fabricating unit 310 to the information processing apparatus 330. The three-dimensional fabricating data storage 422 stores three-dimensional fabricating data received from the information processing apparatus 330. Note that the three-dimensional fabricating data can be stored on the basis of a three-dimensional fabricated object or a layer to be laminated, and is appropriately decided based on the laminating and fabricating speed of the three-dimensional fabricating apparatus 420, the processing speed of the information processing apparatus 330, the communication capacity between the information processing apparatus 330 and the laminating and fabricating controller 320, and the like. In this embodiment, fabricating data of each layer is output for laminating and fabricating of each layer.

The cell selection database 424 stores data used to generate the cell region position of an irradiation candidate not to be influenced by dust from a cell region position currently under irradiation based on the laminating and fabricating conditions in the laminating and fabricating unit 310. In this embodiment, the irradiation cell selector 425 acquires fabricating data of each layer from the three-dimensional fabricating data storage 422. Based on the irradiation cell position currently under laminating and fabricating and an irradiation candidate cell that can be irradiated next and is acquired from the cell selection database 424, the irradiation cell selector 425 notifies the laminating and fabricating instructor 426 of a set of an irradiator and the next irradiation cell position not to be influenced by dust generated by irradiation. When fabricating of each layer is completed, the irradiation cell selector 425 requests the fabricating data of next layer of the three-dimensional fabricating data storage 422. Note that in this embodiment, the irradiation cell selector 425 selects an irradiation cell position for each layer. However, irradiation cell positions may be predicted and selected in advance for the fabricating data of a plurality of layers at once. The laminating and fabricating instructor 426 outputs an instruction to each unit of the laminating and fabricating unit 310 in correspondence with the set of the irradiator and the next irradiation cell position selected by the irradiation cell selector 425. The cell selection database 424, the irradiation cell selector 425, and the laminating and fabricating instructor 426 form an entire irradiation cell controller or a part thereof.

The information processing apparatus 330 can be a general-purpose computer such as a PC (Personal Computer). The information processing apparatus 330 includes a communication controller 431, a three-dimensional fabricating data generator 432, a display 433, an operation unit 434, a three-dimensional fabricating database 435, and a three-dimensional fabricating target data acquirer 436. Note that if the information processing apparatus 330 includes a three-dimensional fabricating target data generation function, the three-dimensional fabricating target data acquirer 436 serves as a three-dimensional fabricating target data generator.

The communication controller 431 controls communication with the three-dimensional fabricating apparatus 420 or a three-dimensional fabricating target data generation apparatus that is an external apparatus. The three-dimensional fabricating data generator 432 generates three-dimensional fabricating data used by the three-dimensional fabricating apparatus 420 to laminate and fabricate a three-dimensional fabricated object using data stored in the three-dimensional fabricating database 435 in accordance with an input or operation of the operator from the operation unit 434 according to an operation instruction displayed on the display 433. The display 433 notifies the status of the three-dimensional fabricating apparatus 420 or the information processing apparatus 330, and requests the operator to input a parameter necessary for laminating and fabricating of a three-dimensional fabricated object. The operation unit 434 includes a keyboard, a pointing device, a touch panel, and the like, and accepts an input or operation instruction from the operator in accordance with an instruction displayed on the display 433. The three-dimensional fabricating database 435 stores the data, generation algorithm, generation parameter, and the like of the three-dimensional fabricated object that are data used by the three-dimensional fabricating data generator 432 to generate three-dimensional fabricating data. The three-dimensional fabricating target data acquirer 436 acquires the three-dimensional fabricating data provided by the three-dimensional fabricating target data generation apparatus via the communication controller 431 or from a storage medium or the like via an I/O interface.

Irradiation Cell Selector

Figure 5:
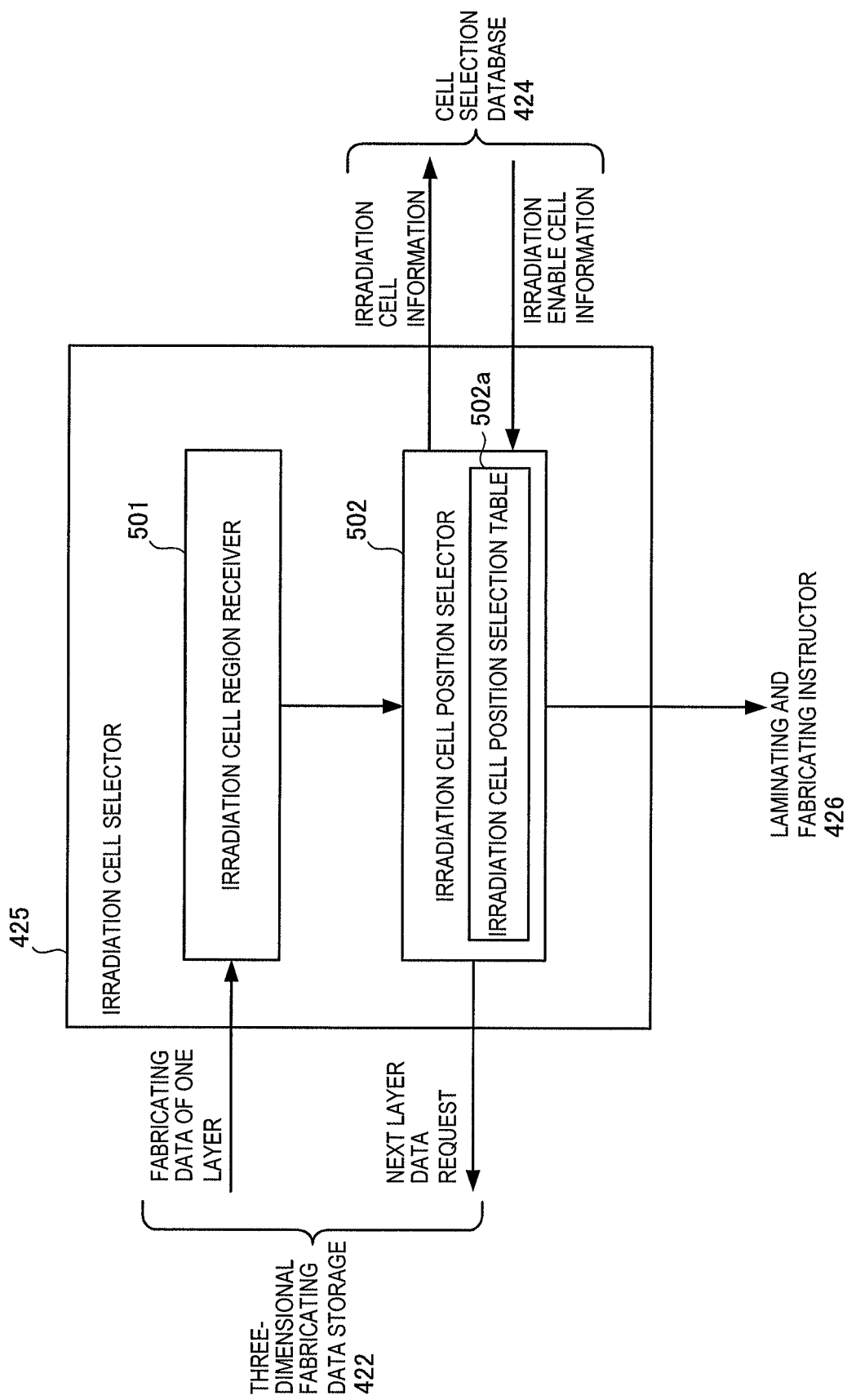
FIG. 5 is a block diagram showing the functional arrangement of an irradiation cell selector according to the second embodiment of the present invention.

FIG. 5 is a block diagram showing the functional arrangement of the irradiation cell selector 425 according to this embodiment.

The irradiation cell selector 425 includes an irradiation cell region receiver 501 and an irradiation cell position selector 502. In this embodiment, the irradiation cell region receiver 501 receives the fabricating data of one layer from the three-dimensional fabricating data storage 422, and sends the data to the irradiation cell position selector 502. The irradiation cell position selector 502 includes an irradiation cell position selection table 502a, and selects a cell to be irradiated next without the influence of dust based on the current irradiation cell position. To do this, the irradiation cell position selector 502 sends current irradiation cell information to the cell selection database 424, and acquires, from the cell selection database 424, irradiation enable cell information generated based on the current irradiation cell information. Then, using the irradiation cell position selection table 502a, the irradiation cell position selector 502 selects a cell region position to be irradiated by each irradiator from the irradiation enable cell information, and output the set of the irradiator and the irradiation cell position to the laminating and fabricating instructor 426. When fabricating of the fabricating data of one layer received from the three-dimensional fabricating data storage 422 is completed, the irradiation cell position selector 502 requests the fabricating data of the next layer of the three-dimensional fabricating data storage 422.

Irradiation Cell Position Selection Table

FIG. 6 is a view showing the arrangement of the irradiation cell position selection table 502a according to this embodiment. The irradiation cell position selection table 502a is used to generate a set of an irradiator to irradiate next and an irradiation cell based the fabricating data and irradiation state of one layer, current irradiator information, and irradiation enable cell information from the cell selection database 424.

The irradiation cell position selection table 502a stores an irradiation state 602, an irradiator ID 603 under irradiation, and irradiation enable cell information 604 from the cell selection database 424 in association with an irradiation cell position 601 to be irradiated for the fabricating data of one layer. The irradiation cell position selection table 502a stores an irradiation selection result 605 for the next irradiation from the irradiator ID 603 under irradiation and the irradiation enable cell information 604 from the cell selection database 424.

The irradiation state 602 includes an unirradiated state, an irradiated state, and an under-irradiation state. The irradiation selection result 605 for the next irradiation includes an irradiator used for irradiation and an irradiation order as an option. The set of the irradiator of the irradiation selection result 605 and the irradiation cell position 601 in an unirradiated state shown in FIG. 6 is selected as the set to be irradiated next. Note that in this embodiment, only the influence of dust is taken into consideration. However, the distance of the irradiation cell or the like may be taken into consideration to select the set to be irradiated next.

Cell Selection Database

Figure 7:
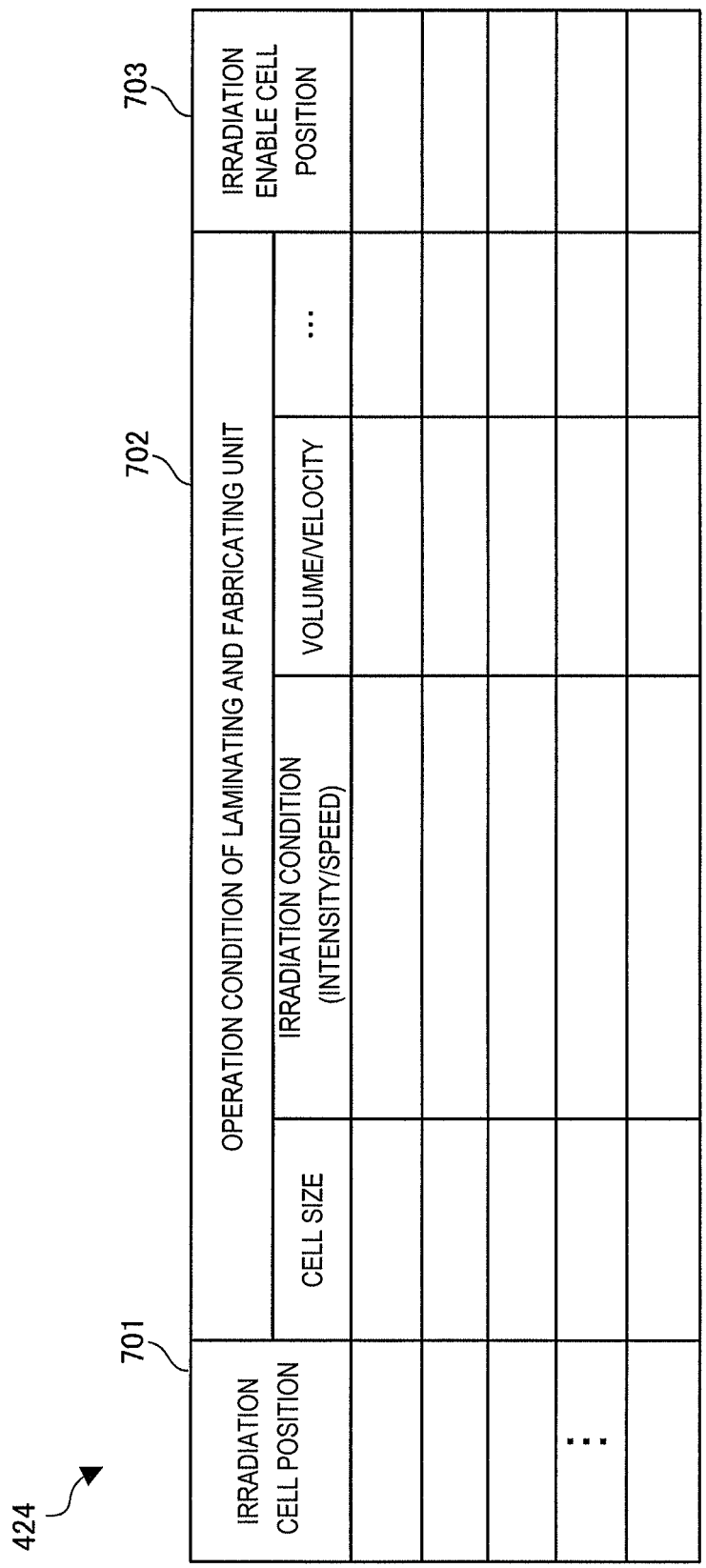
FIG. 7 is a view showing the arrangement of an irradiation cell selection database according to the second embodiment of the present invention.

FIG. 7 is a view showing the arrangement of the irradiation cell selection database 424 according to this embodiment. The cell selection database 424 stores data used to generate irradiation enable cell position information based on the current irradiation cell position and the operation condition of the laminating and fabricating unit 310.

The cell selection database 424 stores cell position information 703 of the next irradiation enable cell in association with irradiation cell position information 701 of the entire laminating and fabricating region of the laminating and fabricating unit 310 and an operation condition 702 of the laminating and fabricating unit 310. The operation condition 702 of the laminating and fabricating unit 310 includes the size of a cell region, irradiation conditions including an irradiation intensity and an irradiation speed, and the volume and velocity of a gas for dust removal.

Laminating And Fabricating Instruction Table

Figure 8:
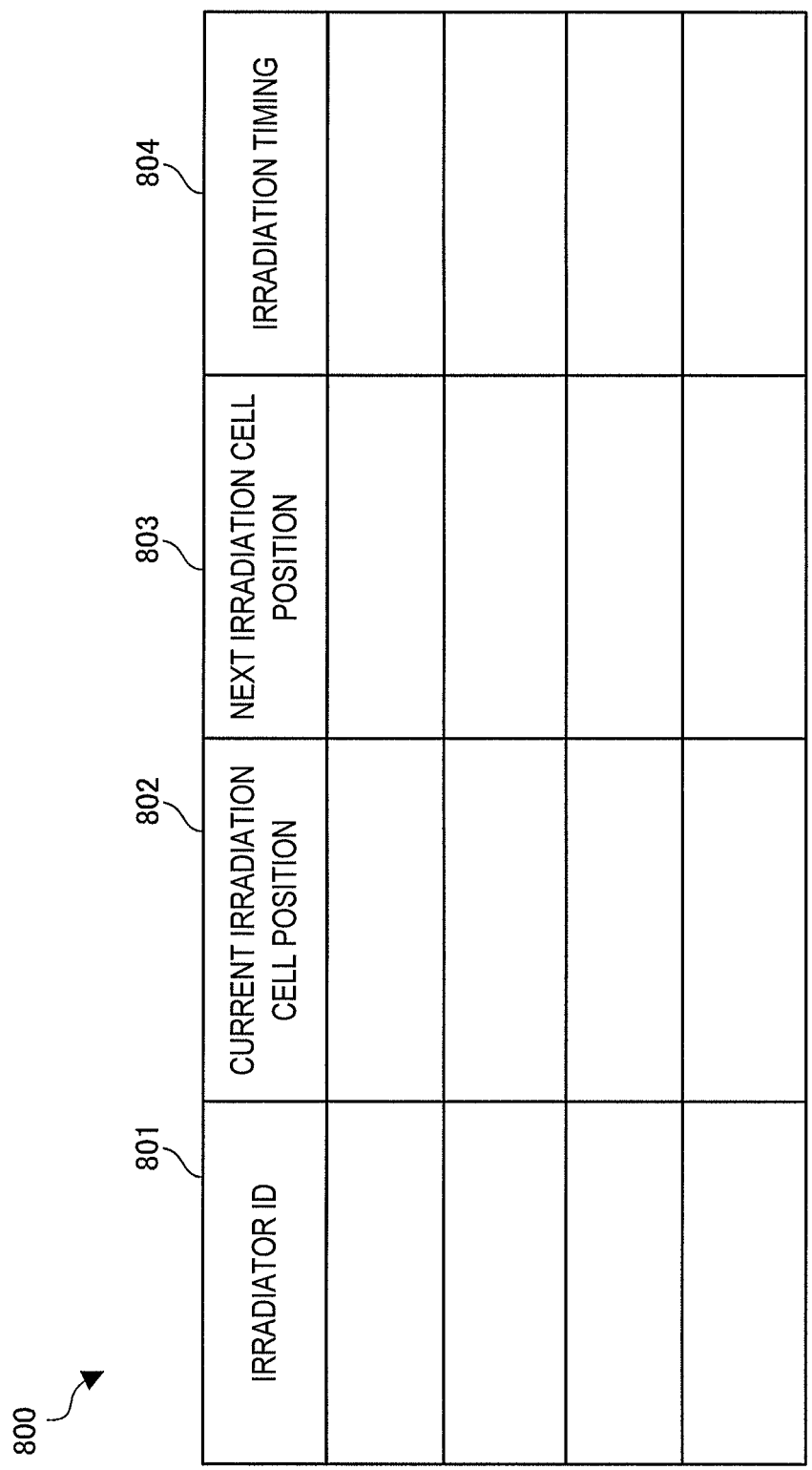
FIG. 8 is a view showing the arrangement of a laminating and fabricating instruction table according to the second embodiment of the present invention.

FIG. 8 is a view showing the arrangement of a laminating and fabricating instruction table 800 according to this embodiment. The laminating and fabricating instruction table 800 is used by the laminating and fabricating instructor 426 to generate a command to be transmitted to the laminating and fabricating unit 310 in correspondence with the set of the irradiator and the cell region selected by the irradiation cell selector 425.

The laminating and fabricating instruction table 800 stores a current irradiation cell position 802, a next irradiation cell position 803, and an irradiation timing 804 as an option in association with each irradiator ID 801.

Hardware Arrangement of Laminating and Fabricating Controller

Figure 9:
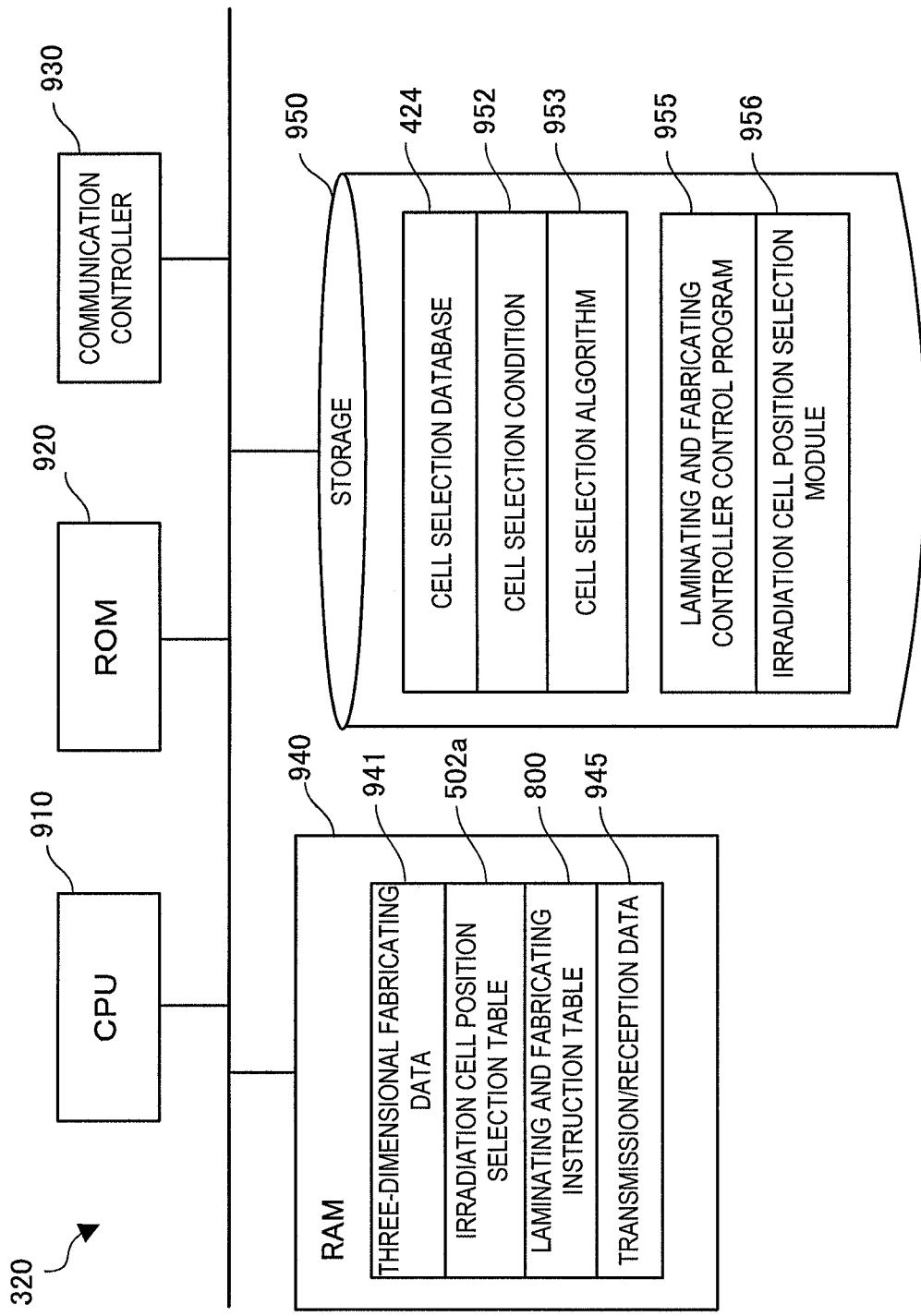
FIG. 9 is a block diagram showing the hardware arrangement of the laminating and fabricating controller according to the second embodiment of the present invention.

FIG. 9 is a block diagram showing the hardware arrangement of the laminating and fabricating controller 320 according to this embodiment.

In FIG. 9, a CPU (Central Processing Unit) 910 is a processor for arithmetic control and implements the functional components of the laminating and fabricating controller 320 shown in FIG. 4 by executing a program. A ROM (Read Only Memory) 920 stores initial data and permanent data such as a program. The communication controller 421 communicates with the information processing apparatus 330 via a network or the like. Note that the number of CPUs 910 is not limited to one, and the CPU 910 may include a plurality of CPUs or a GPU (Graphics Processing Unit) for image processing. In particular, a processor configured to select a cell region to be irradiated and a processor configured to generate various kinds of instructions to control scanning of irradiation in the cell region based on received three-dimensional fabricating data are preferably separate processors. The communication controller 421 also preferably includes a CPU independent of the CPU 910 and writes or reads transmission/reception data in or from an area of a RAM (Random Access Memory) 940.

The RAM 940 is a random access memory used by the CPU 910 as a work area for temporary storage. An area to store data necessary for implementation of the embodiment is allocated to the RAM 940. Three-dimensional fabricating data 941 is the data of a three-dimensional fabricated object that is currently laminated and fabricated. The irradiation cell position selection table 502a is a table described with reference to FIG. 6 which is used to select the next irradiation cell position. The laminating and fabricating instruction table 800 is a table described with reference to FIG. 8 which is used to generate a command to be transmitted to the laminating and fabricating unit 310. Transmission/reception data 945 is data transmitted/received via the communication controller 421.

A storage 950 stores databases, various kinds of parameters, and following data and programs necessary for implementation of the embodiment. The cell selection database 424 is a database described with reference to FIG. 7 which is used to generate next irradiation enable cell position information based on the current irradiation cell position and the operation conditions of the laminating and fabricating unit 310. A cell selection condition 952 is data related to the operation conditions of the laminating and fabricating unit 310 used in this embodiment and generation of next irradiation enable cell position information based on the operation conditions. A cell selection algorithm 953 is an algorithm used to select next irradiation enable cell position information based on the current irradiation cell position and the operation conditions of the laminating and fabricating unit 310.

The storage 950 stores the following programs. A laminating and fabricating controller control program 955 is a control program that controls the entire laminating and fabricating controller 320. An irradiation cell position selection module 956 is a module that selects next irradiation enable cell position information based on the current irradiation cell position and the operation conditions of the laminating and fabricating unit 310.

Note that programs and data associated with general-purpose functions and other implementable functions of the laminating and fabricating controller 320 are not shown in the RAM 940 or the storage 950 of FIG. 9.

Processing Procedure of Laminating and Fabricating Controller

Figure 10A:
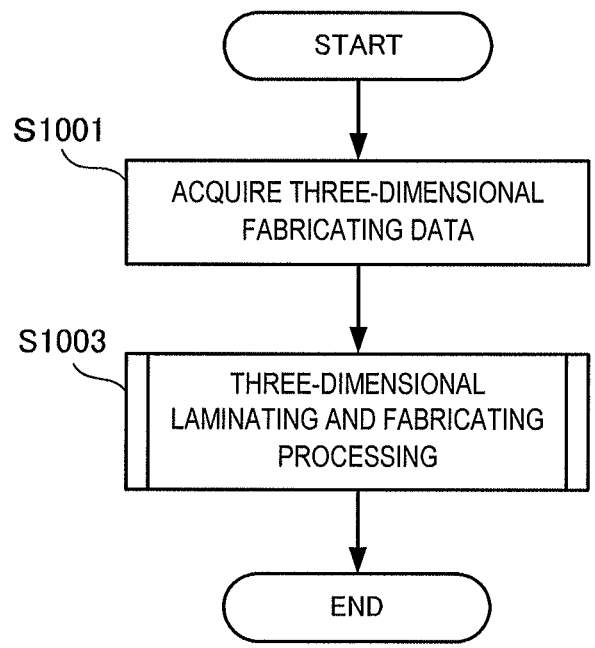
FIG. 10A is a flowchart showing the processing procedure of the laminating and fabricating controller according to the second embodiment of the present invention.

FIG. 10A is a flowchart showing the processing procedure of the laminating and fabricating controller 320 according to this embodiment. This flowchart is executed by the CPU 910 shown in FIG. 9 using the RAM 940 and implements the functional components of the laminating and fabricating controller 320 shown in FIG. 4.

In step S1001, the laminating and fabricating controller 320 receives three-dimensional fabricating data from the information processing apparatus 330 and stores it in the three-dimensional fabricating data storage 422. In step S1003, the laminating and fabricating controller 320 executes three-dimensional laminating and fabricating processing that is not influenced by dust generated from an irradiation position according to this embodiment.

Three-Dimensional Laminating and Fabricating Processing

Figure 10B:
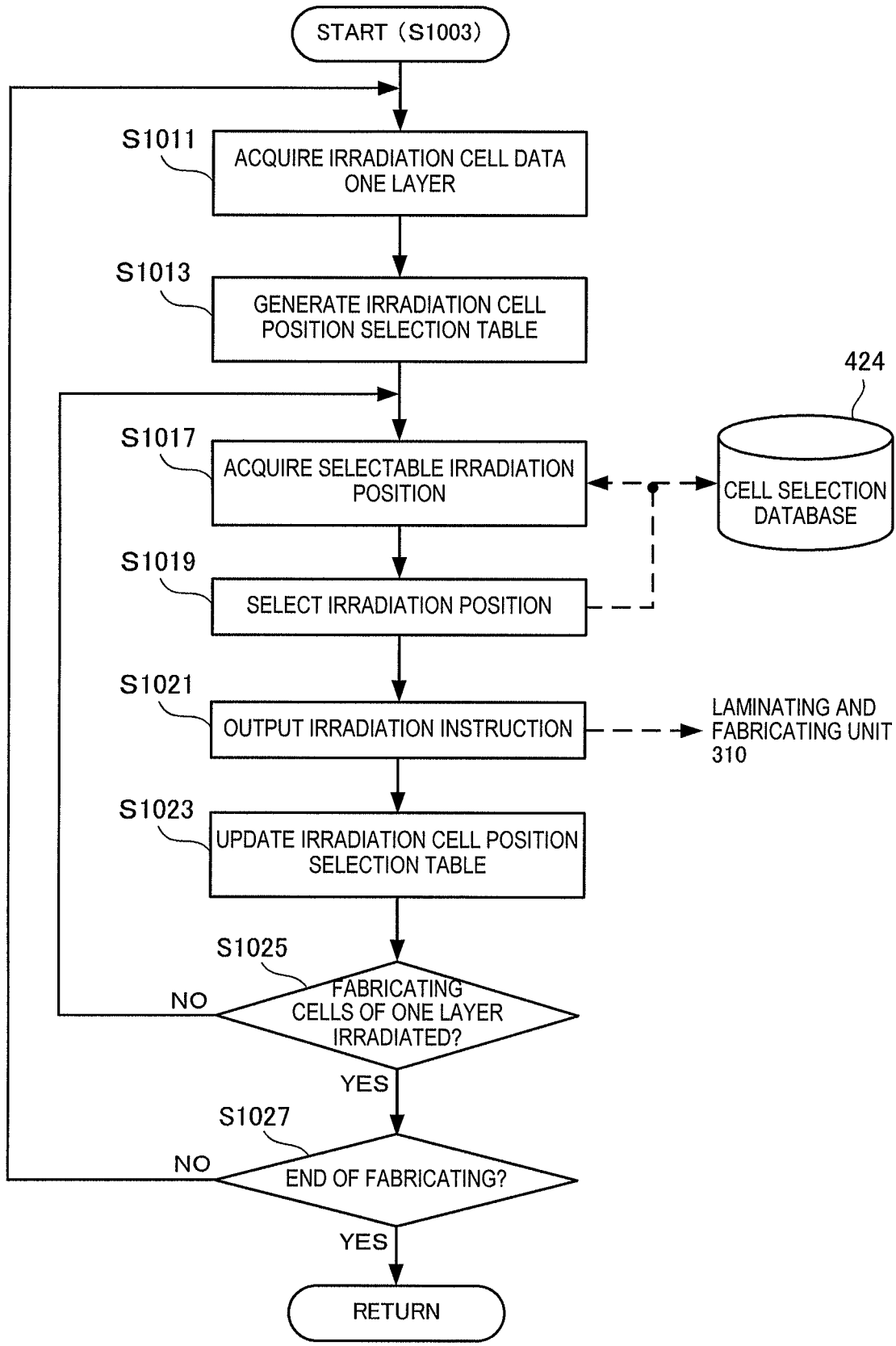
FIG. 10B is a flowchart showing the procedure of three-dimensional laminating and fabricating processing according to the second embodiment of the present invention.

FIG. 10B is a flowchart showing the procedure of three-dimensional laminating and fabricating processing (step S1003) according to this embodiment.

In step S1011, the laminating and fabricating controller 320 acquires irradiation cell data of one layer from the three-dimensional fabricating data storage 422. In step S1013, the laminating and fabricating controller 320 generates the irradiation cell position selection table 502a corresponding to the irradiation cell data of one layer. In step S1017, the laminating and fabricating controller 320 acquires an irradiation enable cell position corresponding to the current irradiation cell position from the cell selection database 424. Note that in the initial selection, the selection is done based on the distance between irradiation cell positions, the subsequent irradiation order, the total irradiation time, or the like.

In step S1019, the laminating and fabricating controller 320 selects an irradiation position to be irradiated next based on the data from the cell selection database 424 using the irradiation cell position selection table 502a. In this case as well, in the initial selection, the selection can be done based on the distance between irradiation cell positions, the subsequent irradiation order, the total irradiation time, or the like. The information of the irradiation position to be irradiated next is fed back to the cell selection database 424.

In step S1021, the laminating and fabricating controller 320 generates an irradiation instruction and outputs it to the laminating and fabricating unit 310. In step S1023, the laminating and fabricating controller 320 updates an unirradiated cell region in the irradiation cell position selection table 502a to an under-irradiation state and then to an irradiated state. In step S1025, the laminating and fabricating controller 320 determines whether irradiation of all fabricating cells of the one layer is completed. If irradiation of all fabricating cells of the one layer is not completed, the laminating and fabricating controller 320 returns to step S1017 to repeat irradiation of an unirradiated cell region without the influence of dust.

If irradiation of all fabricating cells of the one layer is completed, the laminating and fabricating controller 320 determines in step S1027 whether the fabricating of the three-dimensional laminated and fabricated object ends. If the fabricating of the three-dimensional laminated and fabricated object does not end, the laminating and fabricating controller 320 returns to step S1011 to acquire irradiation cell data of the next layer from the three-dimensional fabricating data storage 422. If the fabricating of the three-dimensional laminated and fabricated object ends, the three-dimensional laminating and fabricating end.

According to this embodiment, the next irradiation cell position is selected, in each layer, in a region that is not influenced by dust, based on the current irradiation cell position. This makes it possible to remove the influence of a gas flow between the irradiation positions of a plurality of irradiators.

Third Embodiment

Laminating and fabricating by a three-dimensional laminating and fabricating system according to the third embodiment of the present invention will be described next. The three-dimensional laminating and fabricating system according to this embodiment is different from the second embodiment in that the order of irradiation positions is planned in advance to prevent so the irradiation positions do not have the influence of dust on each other. The rest of the components and operations is the same as in the second embodiment. Hence, the same reference numerals denote the same components and operations, and a detailed description thereof will be omitted.

Concept of Fabricating of Three-Dimensional Laminating and Fabricating System

Figure 11:
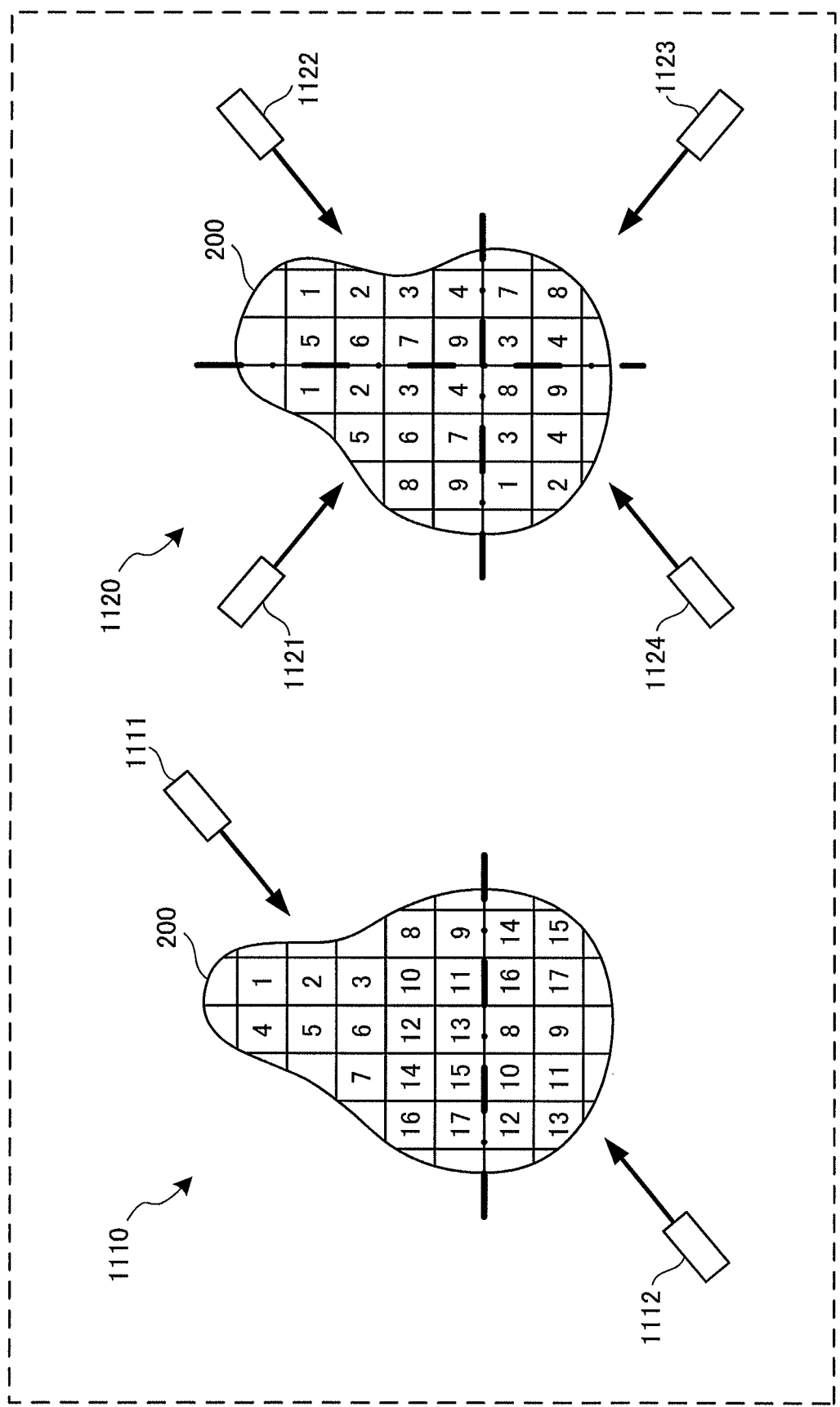
FIG. 11 is a conceptual view showing a fabricating state by a three-dimensional laminating and fabricating system according to the third embodiment of the present invention.

FIG. 11 is a conceptual view showing a fabricating state by the three-dimensional laminating and fabricating system according to this embodiment. Note that the same reference numerals as in FIGS. 2A and 2B denote the same constituent elements in FIG. 11, and a repetitive description will be omitted.

Referring to FIG. 11, the irradiation order of cell positions is determined according to the order of numbers given to the cell positions in advance so the irradiation positions do not have the influence of dust on each other. The left view of FIG. 11 shows a case in which a fabricating portion 200 is divided into two parts, and two irradiators 1111 and 1112 are used to perform laminating and fabricating. Positions having the same number are simultaneously irradiated by the two irradiators 1111 and 1112. This shortens the irradiation time. The right view of FIG. 11, shows a case in which the fabricating portion 200 is divided into four parts, and four irradiators 1121 to 1124 are used to perform laminating and fabricating. Positions having the same number are simultaneously irradiated by some of the irradiators 1121 to 1124. This shortens the irradiation time. The order of irradiation positions is preferably thus planned in advance in consideration of not only the condition that the irradiation cell positions do not have the influence of dust generated from there on each other but also irradiation time shortening, that is, fabricating time shortening.

Irradiation Cell Position Selection Table

FIG. 12 is a view showing the arrangement of an irradiation cell position selection table 1202a according to this embodiment. The irradiation cell position selection table 1202a is used to plan a set of an irradiator to irradiate and an irradiation cell in advance based the fabricating data and irradiation state of one layer, current irradiator information, and irradiation enable cell information from a cell selection database 424 in place of the irradiation cell position selection table 502a according to the second embodiment. Note that the same reference numerals as in FIG. 6 denote the same constituent elements in the irradiation cell position selection table 1202a, and a repetitive description will be omitted.

The irradiation cell position selection table 1202a stores an irradiation selection order 1205 selected in advance not to make dust have an influence in association with an irradiation cell position 601 to be irradiated for the fabricating data of one layer.

According to this embodiment, processing of selecting the irradiation position of an irradiator during laminating of a three-dimensional laminated and fabricated object can be omitted. It is therefore possible to increase the fabricating speed while removing the influence of a gas flow between the irradiation positions of a plurality of irradiators.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present invention is applicable to a system including a plurality of devices or a single apparatus. The present invention is also applicable even when an information processing program for implementing the functions of the embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute processing steps included in the above-described embodiments.

The invention claimed is:

1. A laminating and fabricating control apparatus comprising:

a data acquirer configured to acquire data of a laminated and fabricated object as a target of laminating and fabricating; and a laminating and fabricating controller that controls a laminating and fabricating unit including a plurality of irradiators configured to irradiate a laminating material, and a remover configured to generate a flow path on a laminated surface, and removing dust generated by the irradiated laminating material, to cause said plurality of irradiators to perform irradiation to fabricate each layer of the laminated and fabricated object made of the laminating material as an aggregate of cell regions, said laminating and fabricating controller controlling selection of each of die cell regions to be irradiated by each of said plurality of irradiators based on the data of the laminated and fabricated object so as to prevent the dust generated in each of the cell regions on an upstream side of the flow path from influencing fabricating in each of the cell regions on a downstream side of the flow path, wherein said laminating and fabricating controller controls selection of the cell regions such that, when a first irradiator out of said plurality of irradiators irradiates a first cell region, a second irradiator irradiates a second cell region outside an influence range on the upstream side influencing the first cell region, or a third irradiator out of said plurality of irradiators irradiates a third cell region outside the influence range on the downstream side influenced by the irradiation to the first cell region.

2. A laminating and fabricating control apparatus comprising:

a data acquirer configured to acquire data of a laminated and fabricated object as a target of laminating and fabricating; and a laminating and fabricating controller that controls a laminating and fabricating unit including a plurality of irradiators configured to irradiate a laminating material, and a remover configured to generate a flow path on a laminated surface, and removing dust generated by the irradiated laminating material, to cause said plurality of irradiators to perform irradiation to fabricate each layer of the laminated and fabricated object made of the laminating material as an aggregate of cell regions, said laminating and fabricating controller controlling selection of each of the cell regions to be irradiated by each of said plurality of irradiators based on the data of the laminated and fabricated object so as to prevent the dust generated in each of the cell regions on an upstream side of the flow path from influencing fabricating in each of the cell regions on a downstream side of the flow path, wherein said laminating and fabricating controller controls selection of the cell regions such that, when a first irradiator out of said plurality of, irradiators irradiates a first cell region, a second irradiator out of said plurality of irradiators irradiates a second cell region outside an influence range on the upstream side influencing the first cell region, and a third irradiator out of said plurality of irradiators irradiates a third cell region outside the influence range on the downstream side influenced b the irradiation to the first: cell region.

3. A laminating and fabricating control apparatus comprising:

a data acquirer configured to acquire data of a laminated and fabricated object as a target of laminating and fabricating; and a laminating and fabricating controller that controls a laminating and fabricating unit including a plurality of irradiators configured to irradiate a laminating material, and a remover configured to generate a flow path on a laminated surface, and removing dust generated by the irradiated laminating material, to cause said plurality of irradiators to perform irradiation to fabricate each layer of the laminated and fabricated object made of the laminating material as an aggregate of cell regions, said laminating and fabricating controller controlling selection of each of the cell regions to be irradiated by each of said plurality of irradiators based on the data of the laminated and fabricated object so as to prevent the dust generated in each of the cell regions on an upstream side of the flow path from influencing fabricating in each of the cell regions on a downstream side of the flow path, wherein said laminating and fabricating controller controls selection of the cell regions such that, when a first irradiator out of said plurality of irradiators irradiates a first cell region, a second irradiator irradiates a second cell region outside an influence range on the upstream side influencing the first cell region, and wherein the influence range is set in consideration of at least an irradiation intensity and a scanning speed of each irradiator, a flow velocity of the flow path generated by said remover, and a size of each of the cell regions.

4. A method of controlling the laminating and fabricating control apparatus according to claim 1, comprising:

acquiring data of a laminated and fabricated object as a target of laminating and fabricating; and controlling the laminating and fabricating unit that includes the plurality of irradiators configured to irradiate a laminating material, and the remover configured to generate a flow path on a laminated surface and remove dust generated by the irradiated laminating material, to cause the plurality of irradiators to perform irradiation to fabricate each layer of the laminated and fabricated object made of the laminating material as an aggregate of cell regions, and further controlling selection of a cell region to be irradiated by each of the plurality of irradiators based on the data of the laminated and fabricated object so as to prevent the dust generated in each of the cell regions on an upstream side of the flow path from influencing fabricating in each of the cell regions on a downstream side of the flow path.

5. A non-transitory computer-readable medium storing a control program of the laminating and fabricating control apparatus according to claim 1, which causes a computer to execute a method, comprising:

acquiring data of a laminated and fabricated object as a target of laminating and fabricating; and controlling the laminating and fabricating unit that includes the plurality of irradiators configured to irradiate a laminating material, and the remover configured to generate a flow path on a laminated surface and remove dust generated by the irradiated laminating material, to cause the plurality of irradiators to perform irradiation to fabricate each layer of the laminated and fabricated object made of the laminating material as an aggregate of cell regions, and further controlling selection of a cell region to be irradiated by each of the plurality of irradiators based on the data of the laminated and fabricated object so as to prevent the dust generated in each of the cell regions on an upstream side of the flow path from influencing fabricating in each of the cell regions on a downstream side of the flow path.

6. The laminating and fabricating control apparatus according to claim 1, wherein said laminating and fabricating controller controls selection of the cell regions in accordance with information of an irradiation procedure designed in advance.

7. The laminating and fabricating control apparatus according to claim 2, wherein said laminating and fabricating controller controls selection of the cell regions in accordance with information of an irradiation procedure designed in advance.

8. The laminating and fabricating control apparatus according to claim 3, wherein said laminating and fabricating controller controls selection of the cell regions in accordance with information of an irradiation procedure designed in advance.

9. The laminating and fabricating control apparatus according to claim 1, wherein the influence range is set in consideration of at least an irradiation intensity and a scanning speed of each irradiator, a flow velocity of the flow path generated by said remover, and a size of each of the cell regions.

10. The laminating and fabricating control apparatus according to claim 2, wherein the influence range is set in consideration of at least an irradiation intensity and a scanning speed of each irradiator, a flow velocity of the flow path generated by said remover, and a size of each of the cell regions.

11. A method of three-dig laminating and fabricating, comprising:

providing the laminating and fabricating control apparatus according to claim 1, causing the plurality of irradiators to perform irradiation to fabricate each layer of a laminated and fabricated object made of a laminating material as an aggregate of cell regions, using a laminating and fabricating unit including the plurality of irradiators configured to irradiate a laminating material, and a remover configured to generate a flow path on a laminated surface and remove dust generated by the irradiated laminating material; and controlling selection of each of the cell regions to be irradiated b each of the plurality of irradiators so as to prevent the dust generated in each of the cell regions on an upstream side of the flow path from influencing fabricating in each of the cell regions on a downstream side of the flow path.

* * * * *